United States Patent
Diekhans et al.

(10) Patent No.: US 8,046,139 B2
(45) Date of Patent: Oct. 25, 2011

(54) METHOD FOR CONTROLLING AGRICULTURAL MACHINE SYSTEMS

(75) Inventors: Norbert Diekhans, Guetersloh (DE); Jochen Huster, Guetersloh (DE); Andreas Brunnert, Rietberg (DE); Lars-Peter Meyer Zu Helligen, Spenge (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 1174 days.

(21) Appl. No.: 11/686,991

(22) Filed: Mar. 16, 2007

(65) Prior Publication Data

US 2007/0233348 A1 Oct. 4, 2007

(30) Foreign Application Priority Data

Mar. 30, 2006 (DE) .......................... 10 2006 015 203

(51) Int. Cl.
*G05D 1/00* (2006.01)

(52) U.S. Cl. .......................................... 701/50; 340/990

(58) Field of Classification Search .................. 701/50, 701/202, 207–210, 213, 200; 340/990, 988, 340/689; 342/107, 457; 172/6, 26
See application file for complete search history.

(56) References Cited

U.S. PATENT DOCUMENTS

| 6,128,574 | A | 10/2000 | Diekhans |
| 6,169,940 | B1 * | 1/2001 | Jitsukata et al. ................. 701/23 |
| 6,205,381 | B1 * | 3/2001 | Motz et al. ...................... 701/25 |
| 6,549,849 | B2 * | 4/2003 | Lange et al. ................... 701/213 |
| 6,732,024 | B2 * | 5/2004 | Wilhelm et al. ................ 701/26 |
| 2005/0273253 | A1 | 12/2005 | Diekhans |

FOREIGN PATENT DOCUMENTS

| DE | 10 2004 027 242 | 12/2005 |
| EP | 0 821 296 | 1/1998 |

* cited by examiner

*Primary Examiner* — Dalena Tran
(74) *Attorney, Agent, or Firm* — Michael J. Striker

(57) ABSTRACT

For controlling several agricultural machine systems during operation on a territory, based on a reference line, an optimized route for working the territory is determined for the particular machine system, and the particular machine system is driven along this route. The reference line is determined by recording a reference path that was driven along with a first machine system, and the first machine system is controlled based on this reference line with consideration for the working conditions of the first machine system. This reference line is also transmitted by the first machine system to at least one second machine system, which is controlled based on this reference line of the first machine system and with consideration for the working conditions of the second machine system. A corresponding control system for controlling several agricultural machine systems during operation of a territory is also described.

10 Claims, 4 Drawing Sheets

METHOD FOR CONTROLLING AGRICULTURAL MACHINE SYSTEMS

CROSS-REFERENCE TO A RELATED APPLICATION

The invention described and claimed hereinbelow is also described in German Patent Application DE 10 2006 015 203.4 filed on Mar. 30, 2006. This German Patent Application, whose subject matter is incorporated here by reference, provides the basis for a claim of priority of invention under 35 U.S.C. 119(a)-(d).

BACKGROUND OF THE INVENTION

The present invention relates to a method for controlling several agricultural machine systems during operation on a territory, with which, based on a reference line, an optimized route for working the territory is determined for the particular machine system, then the particular machine system is driven along this route.

The present invention also relates to a corresponding control system for controlling several agricultural machine systems.

Given that the performance of agricultural machine systems, i.e., working vehicles such as combine harvesters or forage harvesters, and tractors with various attachments such as sowing machines, fertilizer spreaders, spraying devices, impellers and swathers, etc., has increased continually, the planning of the working sequence has also become increasingly important in recent years. For specific applications, harvesting in particular, the amount of time available within which work can be carried out is usually limited, usually due to the weather, and this window of time is often not used in an optimal manner due to lack of resource planning. Precise resource planning is also important in order to attain the theoretically maximum possible performance of the machines in practical application.

To attain this goal of an optimized application of effort, route planning systems and route planning methods were developed, which are used to determine an optimized route for working a territory, e.g., a certain field, for the particular machine system. The particular machine system can then be driven along this route—depending on the configuration of the machine system—either fully automatically, i.e., using automatic steering, semi-automatically, or manually with support from a suitable display device, which the driver uses to keep the vehicle on a virtual driving line. Route planning systems of this type and automatic steering systems typically function using satellite-based navigation devices, e.g., GPS receivers (GPS=Global Positioning System). Various correction procedures are used to improve accuracy, such as DGPS (differential GPS) for the GPS method.

A route planning system is described, e.g., in EP 0 821 296 A2. Using this system, the edge of the field is driven around with a GPS device, the coordinates of the field contour are recorded, and additional data specific to the working vehicle—the width, in particular—are entered. Using an electronic data processing device, the course of the working route is generated in the form of a digitized working route using a certain computation algorithm, and a certain optimization criterium for the working route is taken into account. Typical optimization criteria can be, e.g., that any auxiliary driving required, such as paths to be driven to turn around at the ends of the field or to refuel a combine harvester, etc., must be kept to a minimum. Another optimization criterium can be that the time required to work a certain field must be kept to a minimum, with the understanding that somewhat longer turn-around paths that can be traversed more quickly because they do not require a change in driving direction must be accommodated. Optimization can also be carried out with regard for several different optimization criteria in order to reach an optimal compromise between the various optimization criteria.

In many cases, agricultural plots are worked by machine systems having different working widths. If the machine systems are new, they often have a built-in, separate, GPS-based route planning and automation system which—based on the dimensions and other basic conditions of the particular machine system—carries out route planning that is tailored to the particular machine system. This requires that every machine system initially determine at least the outer contour of the territory to be worked, e.g., by driving around it once. This type of procedure takes a relatively great deal of time. It is indeed possible to use driving routes already established in entirety by a route planning system for other applications, as described in EP 0 821 296 B1 and DE 10 2004 027 242 1. This is possible, however, only when the machine system is the same, or, at the least, when it is a machine system with the same or very similar working parameters, such as working width, turning radius, etc.

SUMMARY OF THE INVENTION

An object of the present invention, therefore, is to create a time-saving and, therefore, more cost-favorable method for controlling several agricultural machine systems that also have different machine parameters in particular, and to create a control system therefor.

In keeping with these objects and with others which will become apparent hereinafter, one feature of the present invention resides, briefly stated, in a method for controlling several agricultural machine systems during operation on a territory, comprising the steps of determining, based on a reference line, an optimized route for working the territory for a first machine system; driving the first machine system along the optimized route; determining the reference line by recording a reference path that was driven along with the first machine system; transmitting this reference line by the first machine system to at least one second machine system; controlling the second machine system based on the reference line of the first machine system and with consideration for working conditions of the second machine system.

Another feature of the present invention resides, briefly stated, in a control system for controlling several agricultural machine systems during operation on a territory, comprising a reference line determination device locatable on a first machine system for determining a reference line by recording a reference path that was driven along with the first machine system; a transmitter located on the first machine system for transmitting the reference line to at least one second machine system; a receiver located on the at least one second machine system for receiving the reference line of the first machine system; a route planning device for the second machine system, for determining—based on the reference line received with consideration for working conditions of the second machine system—an optimized route for working the territory for the second machine system.

With the inventive method, the first step is to determine a reference line by recording a reference path that has been driven along with a first machine system. This reference line is transmitted by the first machine system to a second machine system, which is then controlled based on this reference line from the first machine system and with consideration for the working conditions of the second machine system. The working conditions can be machine parameters such as the working width, turning radius, etc. of the machine system itself, or basic conditions such as crop properties and the related consequences for the machine system, etc. This means a separate route is determined for the second machine system based on the reference line; this separate route is tailored to this second machine system.

An inventive control system for controlling a large number of agricultural machine systems during operation of a territory must include a reference line determination device located on a first machine system, to determine a reference line by recording a reference path that has been driven along with the first machine system. A transmitter is also required on the first machine system, to transmit the reference line to at least one second machine system. A second machine system must include a corresponding receiver in order to receive the reference line from the first machine system. A route planning device is also required for the second machine system, to determine an optimized route for the second machine system to work the territory based on the reference line that was received and with consideration for the working conditions of the second machine system.

A driving control unit and/or a display unit are also preferably located on the second machine system, to drive the second machine system along this route.

With the inventive control method and control system, it is therefore no longer necessary for every machine system to be driven along a reference path, e.g., the field contour. The optimum route for the particular machine system can nevertheless be determined and traveled by every machine system in an individualized manner.

Preferably, the first machine system—which recorded the reference line—can also be controlled based on this reference line, with consideration for the working conditions of the first machine system. To this end, a route planning device is required for the first machine system, to determine an optimized route for the first machine system to work the territory based on the reference line and with consideration for the working conditions of the first machine system. A driving control unit and/or a display unit should also be located on the first machine system, to drive the machine system along this route.

The inventive control system can also be refined analogously to the features of the inventive method, and vice versa.

In many cases, it is sufficient to transmit only one reference line, e.g., only one edge of a field, with which the individual tracks extend in parallel, and along which the particular machine system should be driven in order to work the field. Preferably, however, several reference lines are determined by the first machine system and transmitted to the second machine system, e.g., the upper edge of the field, the lower edge of the field, the right and left edges of the field, and paths that extend in the field in appropriate positions at which, e.g., the field can be subdivided into subregions in a suitable manner.

There are various methods for recording the reference line. In one variant, for example, the driver can set a start point on a user interface when he drives along a reference path, and he can set an end point when he has reached the end of the reference path. It is possible to always draw a straight line between the start point and end point as the reference path. This can be done, e.g., when a straight field edge is involved, or a line in the field, along which the field is to be subdivided into subregions. A "contour mode" is also realizable, in the case of which the position coordinates of the vehicle are detected and recorded at regular intervals between the start point and the end point of the reference path. The exact contour of the reference path that was traveled is therefore also detected and can be used as a reference line. As a further alternative, only one start point is assigned, then a certain length of the path is driven.

As described above, a reference line can be an individual path, for example, or just one edge of a field. A reference line can also be composed of several subpaths, however, and the individual subpaths can also be regarded as separate reference lines, of course.

This reference line can always be converted to another coordinate system for use in the second machine system. In a preferred variant, both machine systems use the same coordinate system, however, i.e., the reference line and the optimized route for the first machine system and the second machine system are both determined in the same coordinate system with an exactly defined origin. A local coordinate system is preferably used, the origin of which—e.g., a corner of the territory to be worked—is defined in the form of coordinates of the satellite-based navigation system, e.g., as a GPS position with latitude degree, longitude degree, and elevation. This "zero point" is then identical for all machine systems.

It is basically possible for the first machine system and the second machine system to work the territory in chronological succession, i.e., for these to be machine systems in a process chain, such as a sowing machine and a field sprayer or a cutting machine, followed by impellers and swathers.

In a typical application of the present invention, for example, a harrow with a certain first working width is used on an unworked field in the spring. In this application, a reference line is recorded with the particular machine system (tractor with harrow) and, based on this reference line and with consideration for the working width of the harrow, an optimal route for the harrow is determined. Seeds are sown somewhat later with a sowing machine that has a different working width. The sowing machine receives the reference line from the harrow and, also based on this reference line but with consideration for the working width of the sowing machine, an optimal route for the sowing machine is determined. The same procedure can be used for subsequent uses with other machine systems, e.g., for applying fertilizer or sprayed substances, whereby the machine systems always have different widths. This procedure can be continued indefinitely, that is, e.g., the same reference line can also be used by a combine harvester for harvesting, to determine the optimal route for the combine harvester with consideration for the working width of the combine harvester.

Preferably, however, the method is also used when the first machine system and the second machine system work a territory in parallel, at least part of the time, as is the case, e.g., with a group of machines that work a large territory in parallel. The individual machine systems can also be similar machine systems, e.g., several combine harvesters or several forage harvesters—even of the same type.

In a preferred embodiment, a further, derived reference line is determined based on an originally determined reference line, which is transmitted to the second machine system instead of or together with the originally determined reference line. This means that one or more shifted reference lines are generated out of the originally recorded reference line, for example, and serve as virtual guidance lines that define the driving tracks for the individual machine systems. A fixed offset is preferably provided between the further reference lines. This makes sense, in particular, when the same types of machine systems are used, which work the same field in parallel.

In addition to the reference lines, additional information such as path markings, driving tracks that have already been worked, obstacles, blocked areas, etc., can also be transmitted by the first machine system to the second machine system. They can be taken into account accordingly in the control of the second machine system, i.e., the route planning for this machine system.

Mainly, when several machines work a territory together, at the same time or partially at different times, the transfer of all information—the reference lines in particular—should take place dynamically during the entire working application. This means, as soon as a first machine system determines a new reference line, it is transmitted immediately to the second machine system. The transmission can take place automatically by the machine system and/or it can be triggered by the operator of the particular machine system. It is also possible, however, to prevent or delay the transmission or receipt of new reference lines.

Preferably, the second machine system also includes a suitable reference line determination device, to determine a reference line by recording a reference path driven along with the second machine system. This machine system preferably also includes a transmitter, to transmit the reference line to at least one further machine system. The first machine system also preferably includes a receiver in order to receive the reference line from another machine system. In this manner, the machine systems can also travel a portion of a combined overall reference line—particularly when starting a harvesting operation—and to transmit the reference lines to each other. For example, a machine system could travel along the upper right edge of the field, and the other machine system could travel along the lower left edge of the field, in order to determine all necessary reference lines or partial paths for a combined overall reference line (e.g., an entire field contour) in the shortest time possible, which is then used by the machine system for route planning purposes.

With a preferred variant, it is also possible to determine whether a certain working machine is allowed to specify reference lines for other working machines and therefore function as a type of "master machine", or whether this is only a "client machine" that only receives reference lines from another machine and is controlled according to these reference lines.

For the communication between the machine systems, any type of communication system can be used, along with the transmitters/receivers known therefore, i.e., radio-controlled systems, in particular, as are used in radiotelephony. It is also possible to use mobile wireless communication networks or the like, for example. Particularly preferably, the connections are bidirectional.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
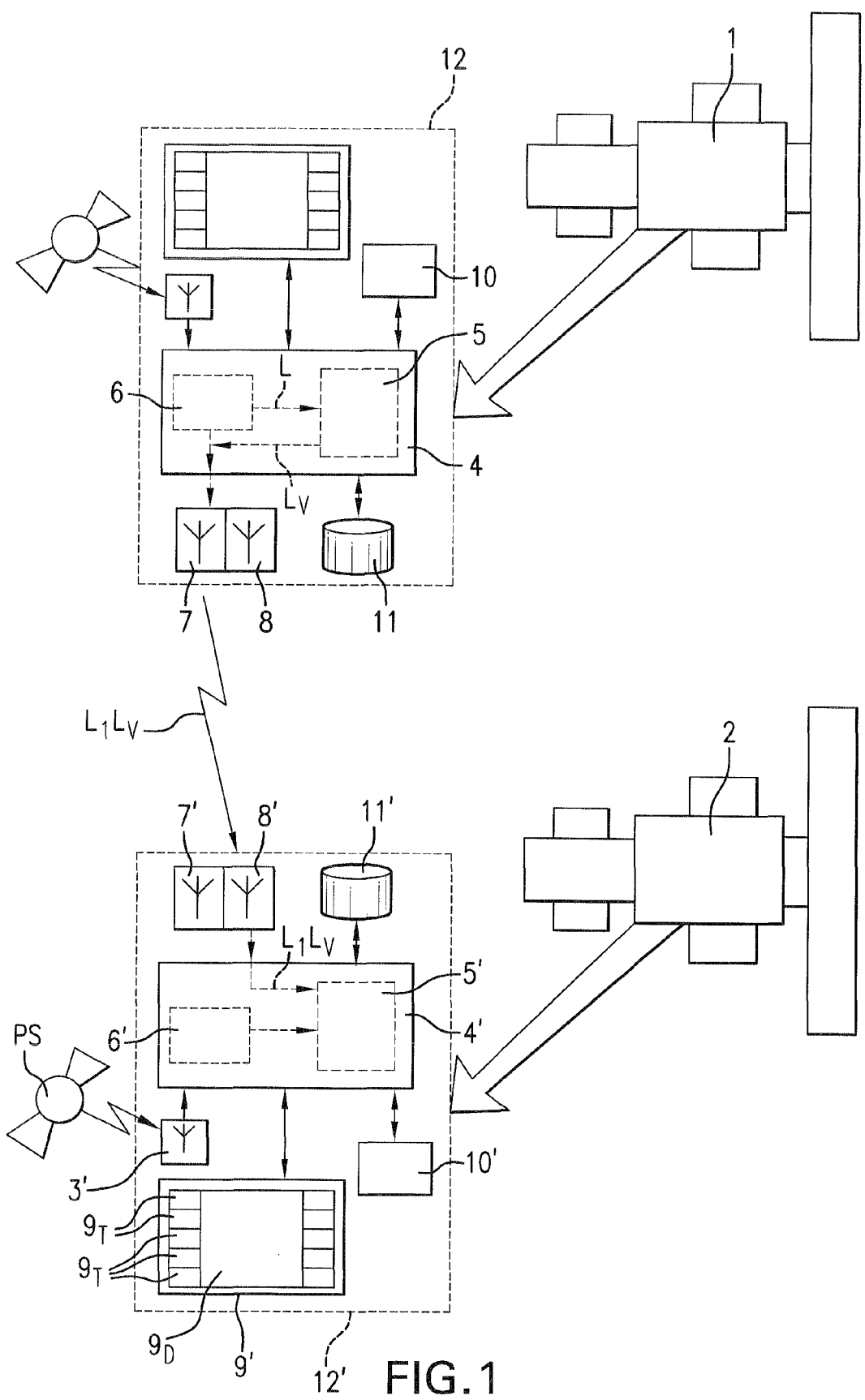
FIG. 1 is a schematic depiction of an inventive control system for controlling two machine systems.

With the exemplary embodiment of the inventive control system shown in FIG. 1, only two identically configured machine systems 1, 2—two combine harvesters in this case—are shown, for simplicity. They can be used together in a group of machines, e.g., to work a large area in the shortest possible time.

The design and mode of operation of combine harvesters 1, 2 are basically known to one skilled in the art, as are suitable control systems for controlling combine harvesters 1, 2. In addition, suitable route planning systems are made known in EP 0 821 296 A1 and DE 10 2004 027 242 A2. Reference is hereby made to the entire contents of these publications. Therefore, only those components of control systems 12, 12' in combine harvesters 1, 2 that are required to explain the present invention are depicted schematically in FIG. 1. Control systems 12, 12'—which, taken together, form an inventive control system—basically have the same design in both combine harvesters 1, 2.

In this case, combine harvesters 1, 2 and control systems 12, 12' each include, e.g., a central control device 4, 4' with a reference line determination device 6, 6' and a route planning device 5, 5'. Central control device 4, 4' can be, e.g., a microprocessor on which reference line determination device 6, 6' and route planning device 5, 5' are realized, in the form of software modules.

Combine harvesters 1, 2 also include a transmitter 7, 7' and a receiver 8, 8', to transmit data to the other combine harvester 2, 1, and to receive data from the other combine harvester 2, 1.

In the exemplary embodiment shown in FIG. 1, reference lines L determined by reference line determination device 6 of first combine harvester 1, and further reference lines $L_V$ determined depending on reference line L are transmitted to receiver 8' of second combine harvester 2.

Each of the combine harvesters 1, 2 also includes a driving control unit 10, 10', with which particular combine harvester 1, 2 can be automatically driven along a route planned by route planning device 5, 5'.

In order to determine reference lines L and for automatic control, each of the combine harvesters 1, 2 requires a position determination device 3, 3', e.g., a GPS receiver, which receives GPS signals from a suitable position satellite PS. This is preferably a GPS receiver that operates in a corrected, satellite-based system, e.g., with DGPS or the like, in order to determine position as exactly as possible, preferably to within a few centimeters.

Reference line determination device 6, 6' also includes corresponding recording means, to record the positions detected using position determination device 3, 3' along a route that has been driven, and, based on this, to generate a reference line L.

Reference line L determined in this manner can then be transmitted to route planning device 5, 5' for further processing, i.e., to plan the optimal route. Reference line L can also be transmitted to transmitter 7, 7', to transmit it to receiver 8, 8' of the other combine harvester 2, 3. A reference line L received by receiver 8, 8' can also be transmitted to route planning device 5, 5', in order to plan an optimal route based on this reference L in the known manner. Reference lines that have been determined, planned routes, and further data can be stored in a memory device 11, 11' for later use.

In the driver's cab of each of the combine harvesters 1, 2 there is a display unit 9 with a display $9_D$ and a number of buttons $9_T$. The display can be a touch screen, with function buttons $9_T$ shown along the edge.

The reference lines that were determined, and/or the reference lines received by another machine system, and/or the optimal route to be traveled are depicted on display $9_D$. In addition, the positions of particular combine harvester 1,2 and the positions of the other machine systems can be depicted in an overall display of the field to be worked. This makes it possible for the driver to detect at any time whether combine harvester 1, 2 he is operating is located in the correct position on the route to be traveled, and where the other machine systems are. Using buttons $9_T$, the driver can select the display mode and switch from automatic driving operation to manual operation.

During manual operation, a virtual guidance line and a symbol for the position of machine system 1, 2 the driver is operating are displayed to the driver on display $9_D$. If the machine system deviates from the route to be driven, this is indicated in the display as the symbol deviating from the virtual guidance line. Using a guidance tool of this type, the driver can steer the vehicle manually relatively exactly along the desired route.

It is clear that an automatic mode, in which combine harvester 1, 2 is driven fully-automatically by driving control unit 10, 10' along the planned route, can be switched off at any time using an emergency button. A shut-off of this type is also attained when the driver grabs the steering wheel or operates the brake, for example. In other words, the driver can override an automatic mode of this type at any time.

Figure 2:
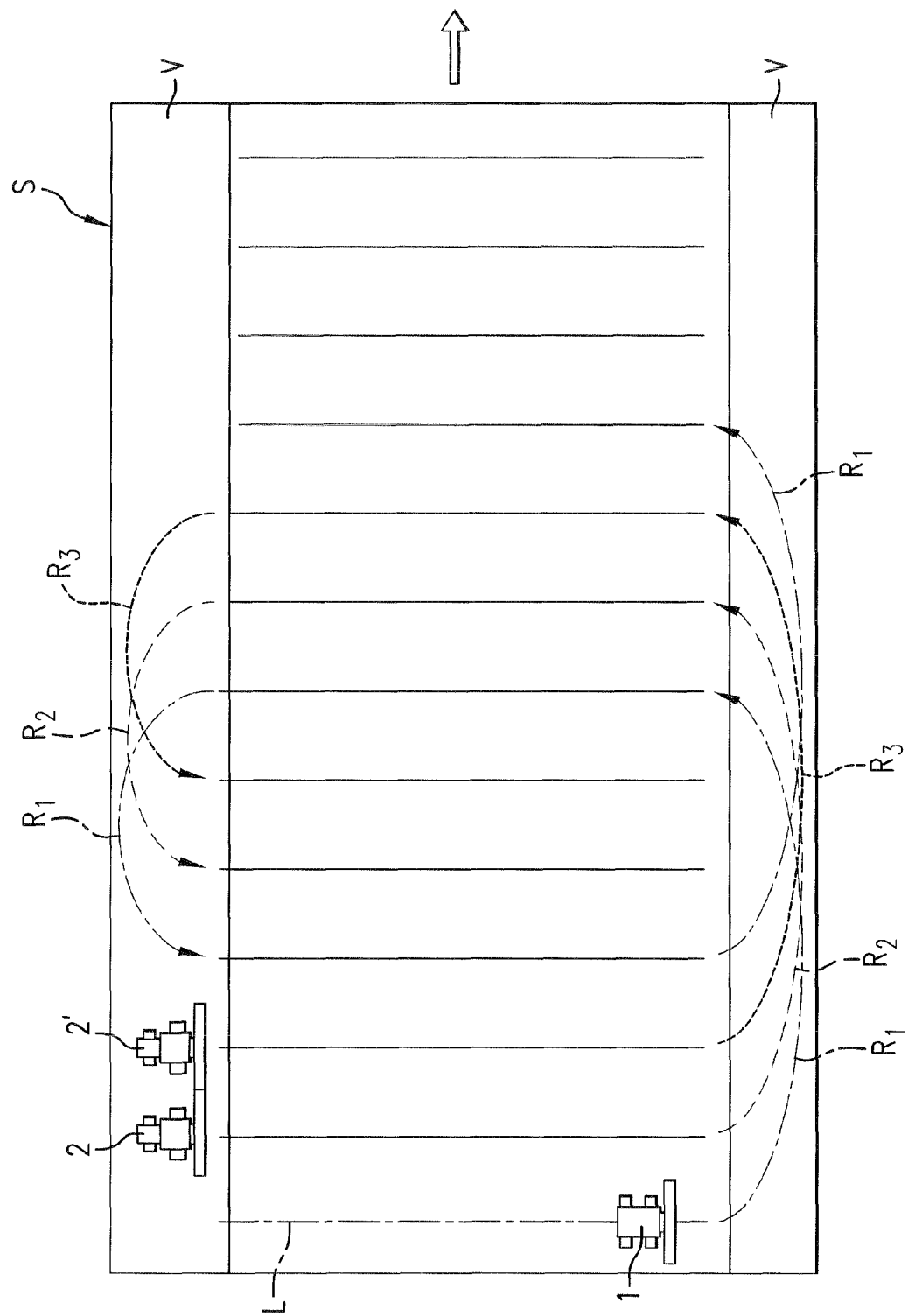
FIG. 2 shows a territory to be worked according to a route plan by a team of machines composed of three machine systems, according to a first exemplary embodiment.

FIG. 2 depicts a possible use of an inventive control system on a relatively large, rectangular field that is being worked with three combine harvesters 1, 2, 2' working in parallel as a group. The combine harvesters and their components required for the inventive control system can be designed as shown in FIG. 1.

Since it is a rectangular field S, it is sufficient when first combine harvester 1 first drives along a first edge—the left edge of the field in this case—and generates guidance line L. Combine harvester 1 transmits guidance line L—i.e., the data required therefore—to the other combine harvesters 2, 2' in the group. Additional information is also transmitted, e.g., in this case, the working width of all combine harvesters 1, 2, 2' working in the group, and then according to a common working strategy in which each combine harvester 1, 2, 2' harvests only every third track. As a result, it is possible for individual combine harvesters 1, 2, 2' to each calculate optimal routes $R_1$, $R_2$, $R_3$, and combine harvesters 1, 2, 2' can each work the field according to these displayed routes $R_1$, $R_2$, $R_3$. In this manner, it is possible to work large field areas very quickly, and, due to the strategic selection of the tracks, it is not necessary for individual combine harvesters 1, 2, 2' to perform long turnaround maneuvers and change driving direction. Instead, they can immediately enter the next track they are scheduled to harvest.

With a procedure of this type, individual combine harvesters 1, 2, 2' and/or their route planning systems are advantageously in permanent data exchange with each other and preferably transmit their own position to the other combine harvesters 1, 2, 2' so it can be taken into account in route planning, and to avoid collisions or waiting times to avoid collisions, which can occur in turnaround areas V in particular.

Figure 3:
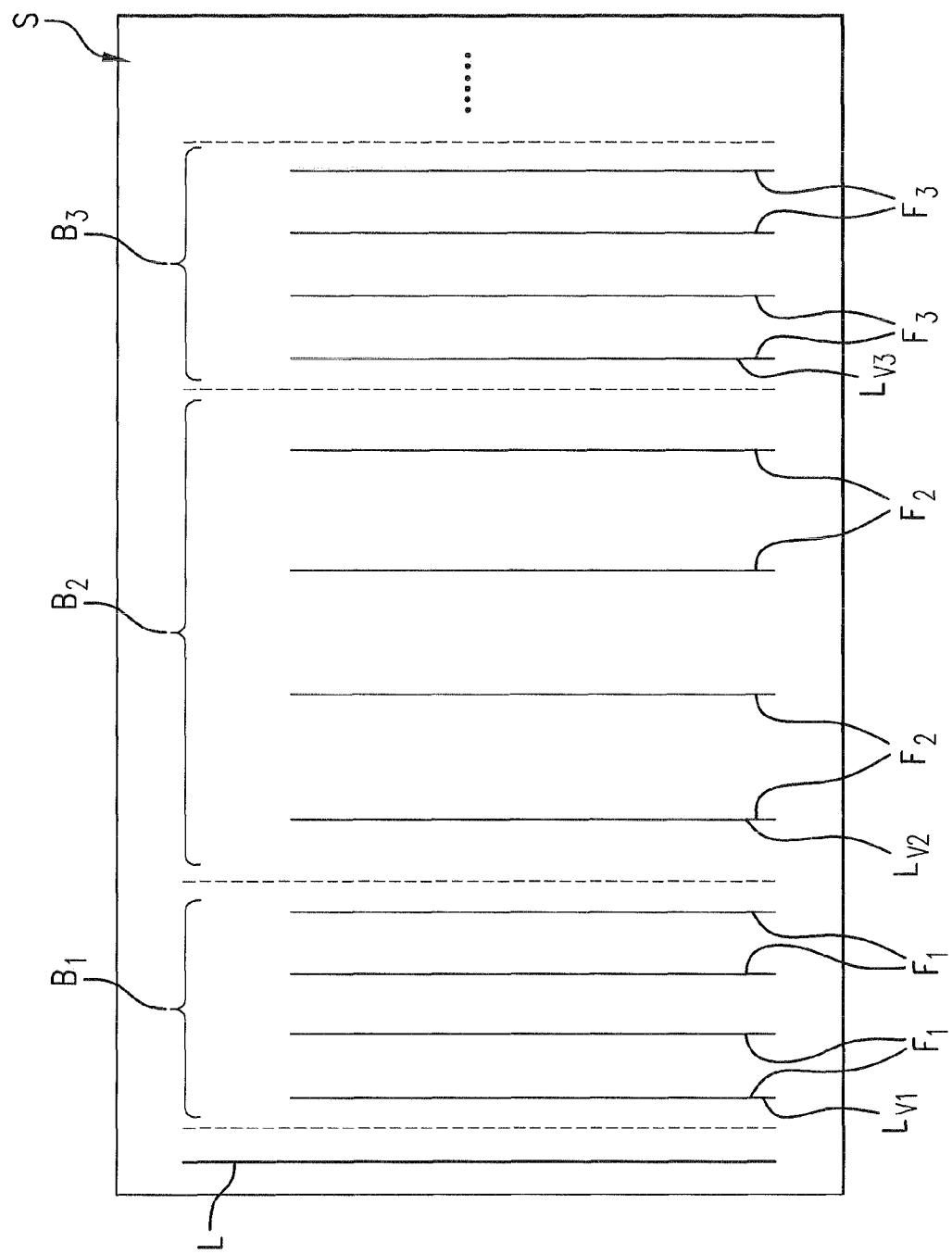
FIG. 3 shows the territory in FIG. 2, which is to be worked according to a route plan by a team of machines composed of three machine systems, according to a second exemplary embodiment.

FIG. 3 shows the same field S, which, in this case, is being worked jointly by three machine systems using a different working strategy. In this case as well, the initial step is drive the first machine system around the outermost left-hand edge of the field and create first reference line L. In this case, however, three machine systems with different working widths will be used. Field S is therefore subdivided in a strategic manner into different crop beds $B_1$, $B_2$, $B_3$, while taking into account which bed $B_1$, $B_2$, $B_3$ will be worked by which machine system with which working width. The sizes of the beds are selected such that each of the machine systems requires four driving tracks $F_1$, $F_2$, $F_3$ to work particular bed $B_1$, $B_2$, $B_3$. Different bed widths therefore result due to the different track widths. Virtual reference lines $L_{V1}$, $L_{V2}$, $L_{V3}$ are derived from originally determined reference line L for individual beds $B_1$, $B_2$, $B_3$, respectively. Based on derived reference lines $L_{V1}$, $L_{V2}$, $L_{V3}$, the individual machine systems can then determine, on their own, further driving tracks $F_1$ $F_2$, $F_3$ within particular bed $B_1$, $B_2$, $B_3$ they are to work, and they can select an optimal route.

Figure 4:
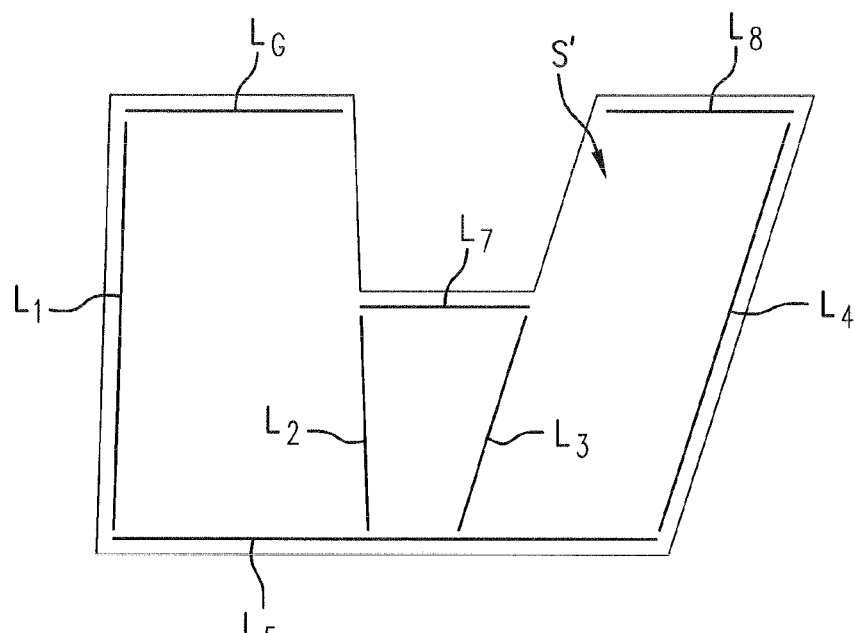
FIG. 4 shows a depiction of possible reference lines in a territory with polygonal outer contours.

FIG. 4 shows how separate surface areas on a field S' with polygonal outer edges can be determined by strategically recording certain reference lines. For example, reference lines $L_1$, $L_5$, $L_4$, $L_6$, $L_7$, $L_8$ that define the outer edges of field S' can be driven along first. Further reference lines $L_2$, $L_3$ can serve to subdivide field S' into three subregions. These reference lines $L_1$, $L_5$, $L_4$, $L_6$, $L_7$, $L_8$ can be determined, e.g., by a first machine system such as a tractor with attachments during the sowing operation and subsequently transmitted to further machine systems that will be required later in the process chain. Based on these reference lines, the downstream machine systems can then plan their own optimal routes.

It is also possible, however, to depict individual beds based on the reference lines, e.g., when working this field in parallel, and to assign these individual beds to different machine systems in a field-working group, each of which then determines an optimal route based on the reference lines for this sub-bed. The particular machine system then works its assigned bed along its optimal route.

Figure 5:
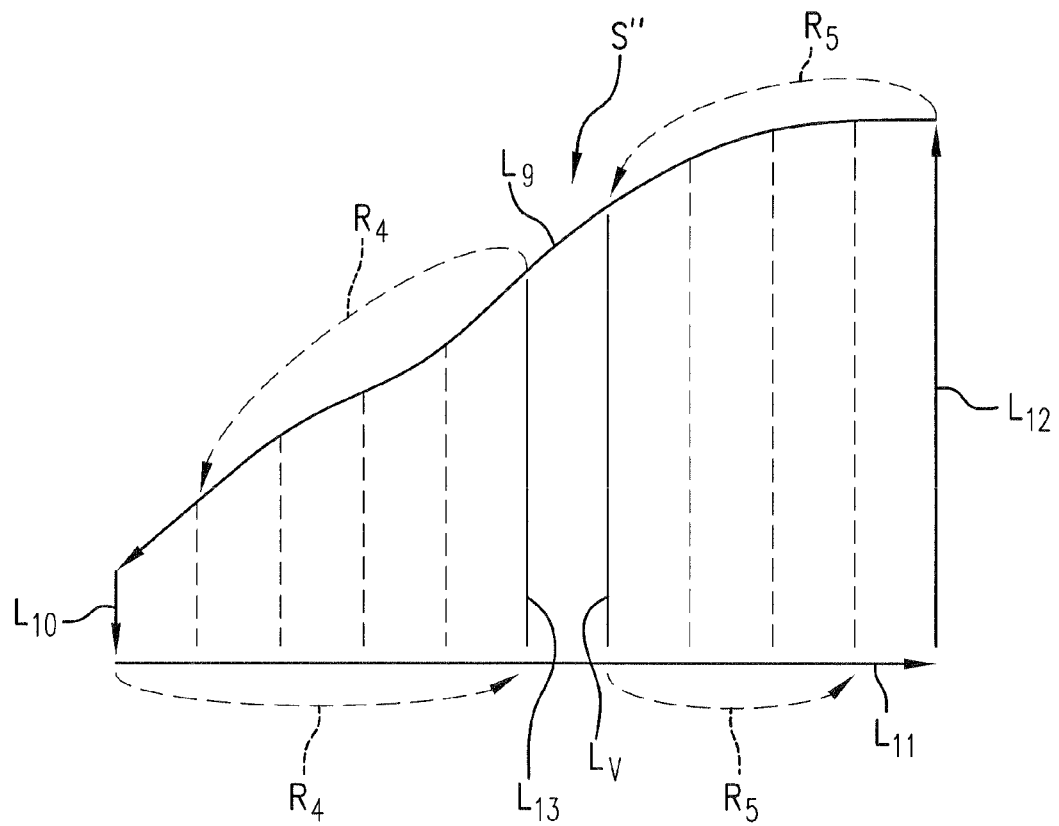
FIG. 5 shows a territory to be worked by two working machines, which is subdivided into driving paths.

A further example of this is shown in FIG. 5. In this case, a field S" is worked by two machine systems in parallel, at least part of the time. To this end, a machine system, e.g., a first combine harvester, is initially driven along the upper edge of the field and "cuts off" the turnaround area at the upper edge of the field. At the same time, the upper contour of field S" is recorded as reference line $L_9$. Second machine system, e.g., a second combine harvester, is simultaneously driven along the lower edge of field S" in FIG. 5 and "cuts off" the turnaround area there, while also recording lower reference line $L_{11}$. Each of the combine harvesters then transmits reference line $L_9$, $L_{11}$ it has determined to the other combine harvesters. On the right edge of field S", the second combine harvester is then driven along the first track from bottom to top and records a further reference line $L_{12}$. In parallel with this, the first combine harvester drives along the shorter track on the left edge of field S', records a further reference line $L_{10}$ there, and then travels a route $R_4$ it has generated, to approximately the middle of the field, along which field S" will be subdivided into two beds $B_4$, $B_5$.

It then "cuts off" a center track and records a further reference line $L_{13}$. This reference line $L_{13}$ is then shifted to the right by one cutting width, thereby resulting in a derived reference line $L_V$, which is suited as a virtual guidance line $L_V$ for second combine harvester to use to work at the boundary of beds $B_4$, $B_5$. This reference line $L_V$ is transmitted to the second combine harvester, which then carries out its route planning and, directly from the right edge of the field, drives along route $R_5$ to a track that corresponds to transmitted reference line $L_V$, so that, after it has worked this track, it can continue to travel along optimal route $R_5$ it has planned.

The exemplary embodiments shown in FIGS. 2, 3 and 5 are only relatively small field sections, of course, and serve merely to illustrate basic possibilities for working fields. In reality, the territories will be much larger and will include a large number of tracks when the aim is to work the field using a group of several machine systems that operate in parallel. The examples serve, however, to easily illustrate the advantages offered by the inventive method, i.e., a machine system generates a central reference line, and this reference line is made available to other machine systems for further applications.

Finally, it is pointed out once more that the machine systems and control systems shown in the figures, and the specific methods explained in context therewith are merely exemplary embodiments and they could be modified in a variety of ways by one skilled in the art, without leaving the framework of the present invention. In interest of completeness, it is also pointed out that the use of the indefinite article "a" does not preclude the fact that the particular feature can also occur in plurality.

It will be understood that each of the elements described above, or two or more together, may also find a useful application in other types of methods and constructions differing from the type described above.

While the invention has been illustrated and described as embodied in a method for controlling agricultural machine systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for controlling several agricultural machine systems during operation on a territory, comprising the steps of determining originally a reference line only by a first machine system; determining by the first machine system, based on the originally determined reference line by the first machine system, an optimized route for working the territory for the first machine system; driving the first machine system along the optimized route; determining the original reference line only by a first machine system by recording a reference path that was driven along with the first machine system; transmitting this original reference line by the first machine system to at least one second machine system; controlling the second machine system based on the original reference line of the first machine system and with consideration for working conditions of the second machine system including crop properties and related consequences; based on the originally determined reference line determined by the first machine system, determining only by the first machine system a further reference line that is transmitted to the second machine system instead of or together with the originally determined reference line that was determined initially by the first machine system, so that the first machine system functions as a master machine and the second machine system receives the originally determined reference line and the further reference line only from the master machine.

2. A method as defined in claim 1; and further comprising controlling the first machine system based on the reference line recorded by the first machine system, with consideration for working conditions of the first machine system.

3. A method as defined in claim 2; and further comprising using a same coordinate system to determine the reference line and to determine optimized routes for the first machine system and the second machine system.

4. A method as defined in claim 1; and further comprising working the territory with the first machine system and the second machine system in chronological succession.

5. A method as defined in claim 1; and further comprising working the territory with the first machine system and the second machine system in parallel, at least part of the time.

6. A method as defined in claim 1; and further comprising determining by the first machine system several reference lines and transmitting the determined several reference lines to the second machine system.

7. A method as defined 1; and further comprising, in addition to the reference line, transmitting additional information by the first machine system to the second machine system.

8. A method as defined in claim 1; and further comprising, if a new reference line is determined using the first machine system, transmitting the new reference line immediately to the second machine system.

9. A control system for controlling several agricultural machine systems during operation on a territory, comprising a reference line determination device locatable on a first machine system for determining initially only by a first machine system a reference line by recording a reference path that was driven along with the first machine system and also a further reference line; a transmitter located on the first machine system for transmitting the initially determined by the first machine system reference line and the further reference line determined by to at least one second machine system; a receiver located on the at least one second machine system for receiving the initially determined by the first machine system reference line and the further reference line of the first machine system; a route planning device for the second machine system, for determining-based on the original reference line received with consideration for working conditions of the second machine system including crop properties and related consequences—an optimized route for working the territory for the second machine system.

10. A control system as defined in claim 9; and further comprising a reference line determination device locatable on the second machine system for determining a reference line by receiving a reference path driven along with the second machine system; a transmitter for transmitting the reference line to at least one further machine system; and a receiver provided in the first machine system for receiving a reference line from the further machine system.

\* \* \* \* \*